United States Patent
Yang et al.

(10) Patent No.: US 8,566,867 B1
(45) Date of Patent: Oct. 22, 2013

(54) PRE-FETCH ADS WHILE SERVING ADS IN LIVE STREAM

(75) Inventors: Jianfeng Yang, San Jose, CA (US); Karl Adam Christensen, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/438,698

(22) Filed: Apr. 3, 2012

(51) Int. Cl.
*H04N 7/025* (2006.01)

(52) U.S. Cl.
USPC ............... 725/36; 725/32; 725/34; 725/35

(58) Field of Classification Search
USPC .............................. 725/32, 34, 35, 36
See application file for complete search history.

(56) References Cited

U.S. PATENT DOCUMENTS

| | | | | |
|---|---|---|---|---|
| 6,826,193 | B1* | 11/2004 | Peisa | 370/437 |
| 2002/0144262 | A1* | 10/2002 | Plotnick et al. | 725/32 |
| 2004/0158858 | A1* | 8/2004 | Paxton et al. | 725/42 |
| 2007/0157231 | A1* | 7/2007 | Eldering et al. | 725/35 |
| 2007/0300261 | A1* | 12/2007 | Barton et al. | 725/58 |
| 2008/0109844 | A1* | 5/2008 | Baldeschwieler et al. | 725/35 |
| 2009/0210899 | A1* | 8/2009 | Lawrence-Apfelbaum et al. | 725/34 |
| 2012/0036023 | A1* | 2/2012 | Das et al. | 705/14.71 |
| 2012/0047542 | A1* | 2/2012 | Lewis et al. | 725/97 |
| 2012/0166289 | A1* | 6/2012 | Gadoury et al. | 705/14.66 |
| 2012/0167132 | A1* | 6/2012 | Mathews et al. | 725/32 |

\* cited by examiner

*Primary Examiner* — Pankaj Kumar
*Assistant Examiner* — Sahar Baig
(74) *Attorney, Agent, or Firm* — Dickinson Wright PLLC

(57) ABSTRACT

Described herein are techniques related to pre-fetching ads while serving ads in a live streaming video. In one implementation, the pre-fetching mechanism will set up a default set of ads pre-fetching criteria on a client and then the client will parse new/extra ads pre-fetching criteria from a live stream. Next the default set of ads pre-fetching criteria on the client will update via the parsed new/extra ads pre-fetching criteria. Now a notification from the live stream to pre-fetch ads is received by the client and the pre-fetched ads are obtained from the live stream. The client will receive a notification from the live stream to show ads and pre-fetched ads will be shown on the client. This Abstract is submitted with the understanding that it will not be used to interpret or limit the scope or meaning of the claims.

14 Claims, 8 Drawing Sheets

PRE-FETCH ADS WHILE SERVING ADS IN LIVE STREAM

BACKGROUND

More and more users are watching online live streaming video (i.e., "live stream"). For instance, a number of users (i.e., "viewers") may watch National Basketball Association (NBA) games on the ESPN™ website (or Machinima™ games on a video hosting service). By and large, live streaming video is synchronized for all viewers. Consequently, each viewer will see live streamed advertisements (i.e., "streaming ads") at the same "wall-clock" time. Conversely, video on demand (VOD) viewers are not synchronized, and thus can start watching streaming video at any time. The VOD views see streaming advertisements at arbitrary times or asynchronously.

SUMMARY

Described herein are techniques related to pre-fetching ads while serving ads in a live streaming video. In one implementation, the pre-fetching mechanism includes setting up a default set of pre-fetching criteria on the client; parsing new/extra pre-fetching criteria from the live stream; updating the default set of pre-fetching criteria on the client via the parsed new/extra pre-fetching criteria; receiving a notification from the live stream to pre-fetch ads; obtaining the pre-fetched ads from the live stream; receiving a notification from the live stream to show ads on the client; and showing the pre-fetched ads on the client.

This Summary is submitted with the understanding that it will not be used to interpret or limit the scope or meaning of the claims. This Summary is not intended to identify key features or essential features of the claimed subject matter, nor is it intended to be used as an aid in determining the scope of the claimed subject matter.

BRIEF DESCRIPTION OF THE DRAWINGS

The Detailed Description references the accompanying figures. In the figures, the left-most digit(s) of a reference number identifies the figure in which the reference number first appears. The same numbers are used throughout the drawings to reference like features and components.

DETAILED DESCRIPTION

With the technology described herein, a live streaming advertisement ("ads") server is able to fulfill anticipated overwhelming requests for streaming advertisement during a live stream by delivering pre-fetched ads to the clients for them to display at the appropriate synchronized time.

When a huge number (e.g., ten million) of viewers are watching a live stream, streaming advertisements (i.e., "ads") are scheduled to show at a specific designated times (e.g., twenty minutes after an event/game starts). In this instance, ten million clients send ads requests to the ads server concurrently or nearly so. The ads server's query per second (QPS) will be extremely high (e.g., on the order of 10,000,000 QPS). Since the ads server may be unable to fulfill such a high QPS, the ads server may be forced to decline many requests. Consequently, revenue from the delivery of streaming ads may be reduced because less that all of the viewers of a live stream were able to view the streaming ads.

The technology described herein reduces the ads server's QPS by pre-fetching ads in a live stream for the clients to display at a later time concurrently. With conventional live streaming, the ads server is unable to adequately provide a vast multitude of live-streaming ads to vast multitude of clients that request such ads nearly concurrently. With the new live streaming technology, a client may pre-fetch ads from the ad server for the client to display later and concurrently with the other clients. This reduces the overall QPS for the ads server. The new technology may save live-streaming providers money by reducing the need to add additional ads servers.

It is to be appreciated that in accordance with one or more implementations described in this disclosure, users can opt-out of providing personal information (e.g., for their client or user profile(s)), demographic information, location information, proprietary information, sensitive information, or the like in connection with data gathering aspects. Moreover, one or more implementations described herein can provide for anonymizing collected, received, or transmitted data.

Example Live-Streaming Scenario

Figure 1:
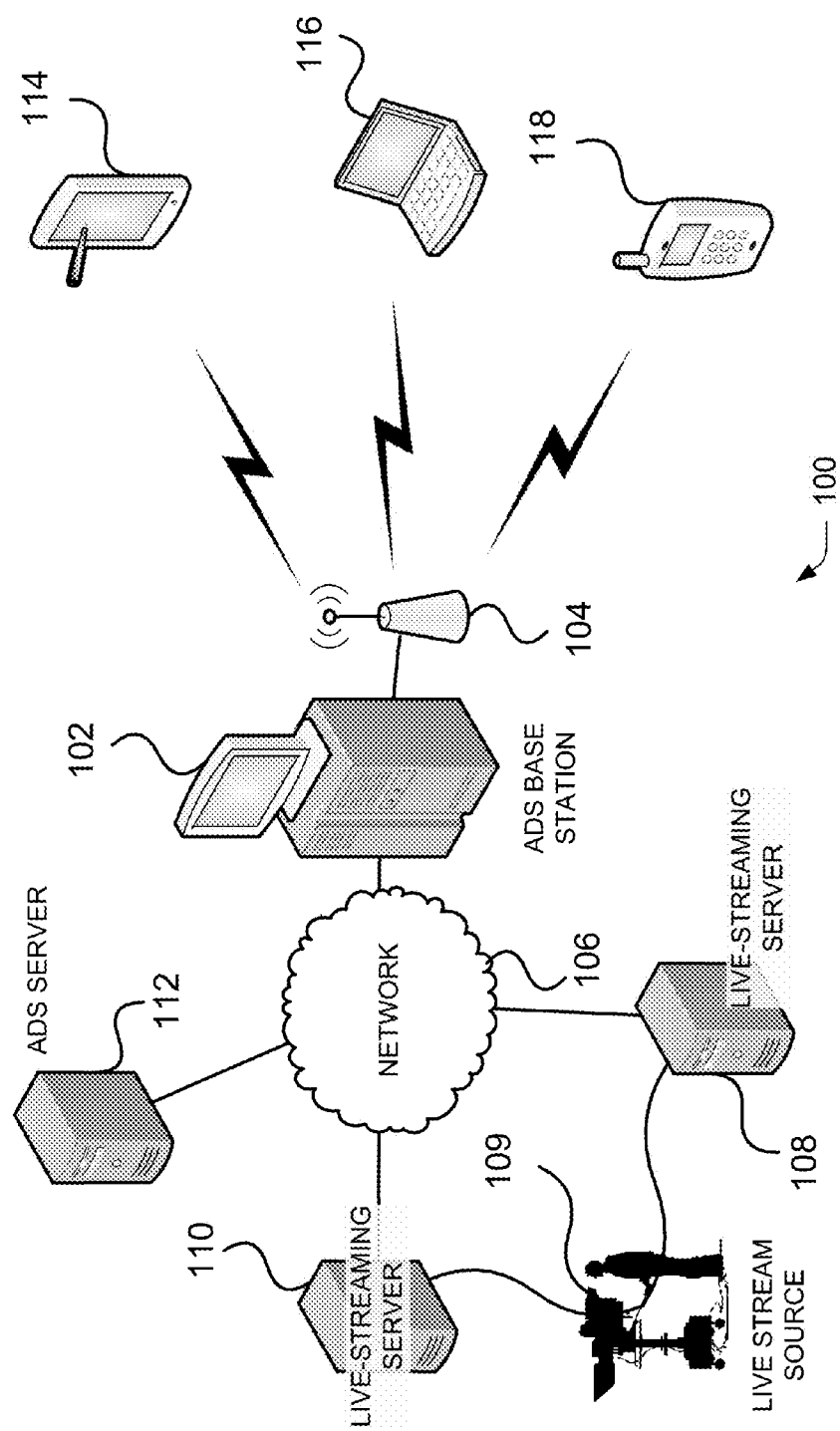
FIG. 1 is an example architecture of an ads base station live streaming video to wireless and possibly mobile clients within a wireless cell according to an implementation of the technology.

FIG. 1 depicts an example live-streaming scenario 100 in which the technologies described herein may be implemented. The example live-streaming scenario 100 includes an ads base station 102, a mobile communications (e.g., wireless) antenna 104, a network 106 (e.g., the internet), live-streaming servers 108, 110, a live-stream source 109, an ads server 112, and one or more clients (such as tablet computer 114, laptop computer 116, and smartphone 118).

The live-streaming servers 108, 110 acquire a video from the live-stream source 109. Typically, such source video is from a live event like a sports match, music concert, awards show, gala happening, or other even as it is happening (or shortly thereafter). The live-streaming servers 108, 110 provide the video in real time to clients via the network 106. Thus, the video provided in this manner may be called "live stream." As used herein, a live stream includes a stream provided concurrently to multiple viewers concurrently. The content does not actually have to be "live," in the sense that the event is occurring as it is being transmitted.

From the network 106, the ads base station 102 streams live video to wireless or mobile clients 114-118 on the mobile communications (e.g., wireless) antenna 104. When requested, the ads server 112 provides the streaming advertisements ("ads") to the clients via the network 106. With the technology, the ads base station 102 will aid in the pre-fetching of ads from the ads server 112 to the clients requesting them.

The network 106 represents any one or combination of multiple different types of networks interconnected with each other and possibly functioning as a single large network (e.g., the Internet or an intranet). The network 106 may include wire-based networks (e.g., cable) and wireless networks (e.g., cellular, satellite, etc.).

While clients 114-118 are shown wirelessly connected to the communications antenna 104, one or more such clients may be connected via a wired communications network. Clients 114-118 may be any computing device suitable for receiving live streams from the live-streaming servers 108 or 110 and playing such live streams for viewing by one or more viewers. For example, a client may be a laptop, tablet computer, a personal digital assistant ("PDA"), a mobile phone (such as cell phone or a smart phone), a thin client, a portable gaming device, a consumer electronic devices (such as TVs, DVD players, set top boxes, monitors, displays, etc.), a public computing device (such as a kiosk, an in-store music sampling device, an automated teller machine (ATM), a cash register, etc.), navigation device, and/or a non-conventional computing device, such as a kitchen appliance, a motor vehicle control (e.g., steering wheel), etc., or a combination thereof. Clients 114-118 may include hardware components such as a processor, a graphics card, a storage component, a memory component, an antenna, a communication component, an input/output component such as a speaker, a display, a keypad, a microphone, or the like.

Example Live-Streaming Ads Base Station

Figure 2A:
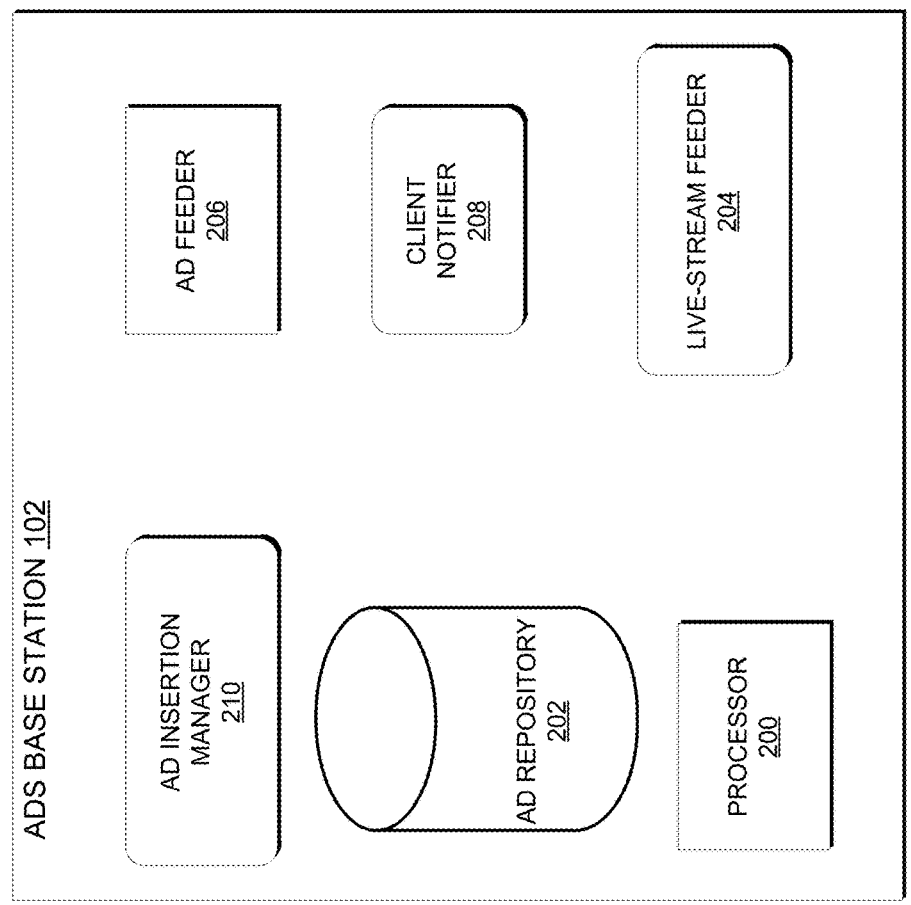
FIG. 2A is a detail block diagram of an example ads base station according to an implementation of the technology.

FIG. 2A shows a detail block diagram of an example of the ads base station 102 that is suitable for one or more implementations of the technology described herein. The ads base station 102 includes a processor 200, an ad repository 202, a live-stream feeder 204, an ad feeder 206, a client notifier 208 and an ad insertion manager 210.

The processor 200 of ads base station 102 may include any appropriate type of processor such as a single processor, multiple processors that may be distributed or centrally located, or the like. For example, the processor 200 may be a desktop computing device processor, a mobile communications device processor, a handheld processor, or the like. The processor 200 may include or link to any other suitable hardware such as cache, memory, storage devices, or the like and/or software.

The ad repository 202 of ads base station 102 may be configured to store the ads received from the ad server 112, live-streaming servers 108, 110 over the network 106 to be pre-fetched. The live-stream feeder 204 may be configured to feed or pass the live-stream to clients 114-118 via the communications antenna 104. The ad feeder 206 may be configured to feed or pass the pre-fetched ads in a similar manner as the live-stream feeder 204.

The client notifier 208 may be configured to send commands to clients 114-118, such as to pre-fetch an ad or to show an ad that has been pre-fetched. The ad insertion manager 210 may be configured to act as a controller of which ads are called out from the ad repository 202 to be pre-fetched into the live-stream based on any call-outs received from the live-streaming servers 108, 110, the ads server 112 and/or the network 106.

Example Pre-Fetching Configuration

Figure 2B:
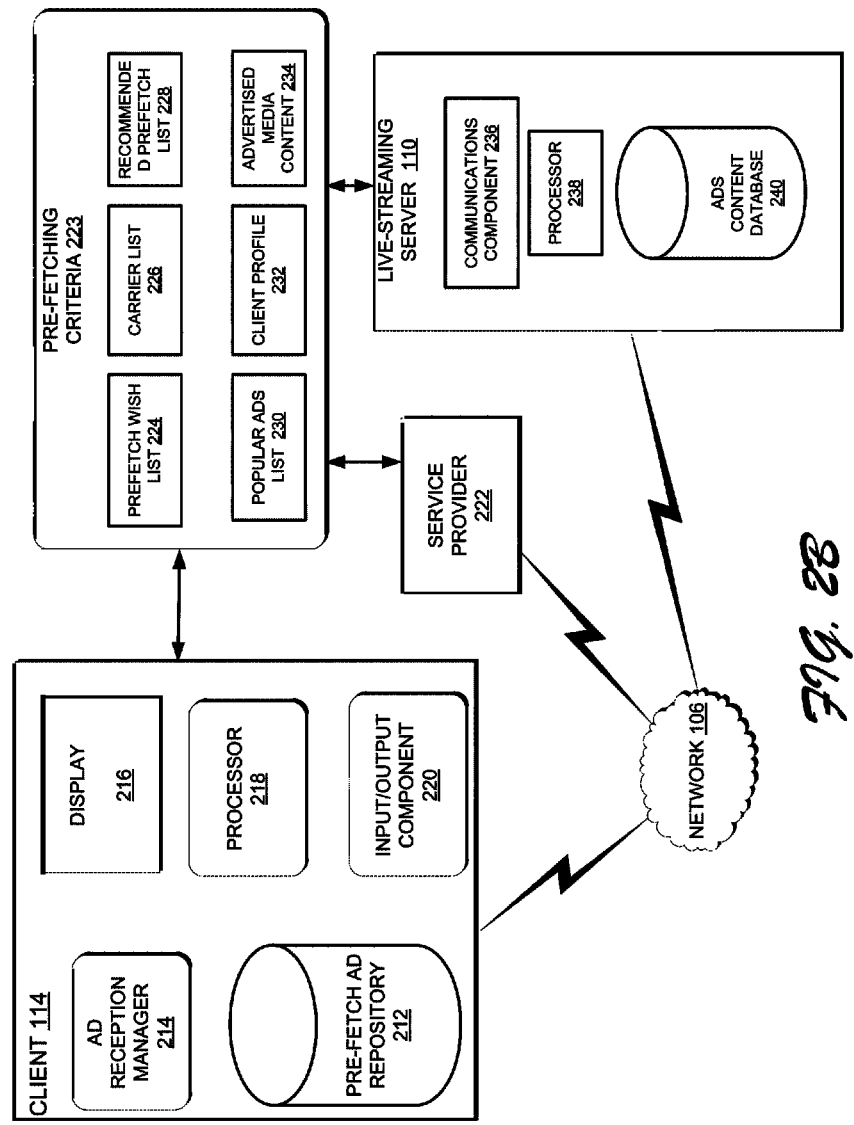
FIG. 2B is a detail block diagram of an example configuration of a system that can utilize the disclosed technology.

FIG. 2B depicts an example configuration of a system that can utilize the disclosed techniques. The system may include a client (such as client 114), a service provider 222, and the live-streaming server 110 that may communicate over a network 106. The client 114, service provider 222, or live-streaming server 110 may, separately or in combination with another, maintain, update, or contribute information to compile a default set of ads pre-fetching criteria 223.

In the implementation shown in FIG. 2B, the client 114 include a display component 216, one or more processors 218, an ad reception manager 214, an input/output component 220, and a pre-fetched ad repository storage 212, shown as a database. Each of these components may be interconnected to share resources and information. Ads content may be text, audio, still images, animation, video, interactivity content forms or the like.

The display component 216 may be any form of display for the presentation of information for visual, audio, tactile reception, or the like. For example, the display component may be a common television set display, a computer monitor, a handheld LCD screen, or the like. The ad reception manager 214 may include an antenna, communication port, or the like that may be used to establish a communication link with a network, such as network 106. The ad reception manager 214 may then communicate with servers or the like over the network to connect the device with other computing components or servers, such as the live-streaming server 110 or the service provider 222.

The processor 218 of client 114 may include any appropriate type of processor such as a single processor, multiple processors that may be distributed or centrally located, or the like. For example, the processor 218 may be a desktop computing device processor, a mobile communications device processor, a handheld processor, or the like. The processor 218 may include or link to any other suitable hardware such as cache, memory, storage devices, or the like and/or software.

The input/output component 220 may include, for example, an input component such as a keypad, a touch screen, a button, a microphone, or the like, and an output component such as a transmitter, a speaker, a microphone, or the like. A user may interact with client 114 via the input/output component 220 to access various types of media content. For example, a user may select to listen to an audio file, or select to view a video display on the display component 216. Often, a user will stream media content over a network, such as the Internet. For example, via a web browser viewable on the display component 216, the user may browse the Internet via the input/output component. The user may select or "click on" media files that are accessible from a carrier to download or stream to the user's local machine, such as client 114. As disclosed herein, ads content may be distributed to client 114, in a non-requested instance, and stored in the pre-fetched ad repository database 212.

In the example configuration shown in FIG. 2B, the ads content is stored in the ads content database 240. The ads content database 240 may be any form of data storage, including a storage module, device, or memory, for example. The ads content database 240 may be provided as a database management system, an object-oriented database management system, a relational database management system (e.g., DB2), a file system, or another conventional database package. Further, the databases can be accessed via a Structure Query Language (SQL), or other tools known to one of ordinary skill in the art.

As shown in FIG. 2B, client may be in communication with the network 106. The network 106 may be any type of network such as the internet, a Local Area Network (LAN), a Wide Area Network (WAN), a cellular telephone network, or the like. For example, the network 106 may include the example networks such as, Global System for Mobile communication ("GSM"), General Packet Radio Service ("GPRS"), Universal Mobile Telephone System ("UMTS"), Frequency Division Duplexing ("FDD") and Time Division Duplexing ("TDD"), High Speed Packet Data Access ("HER-MDA"), cdma2000 1x Evolution Data Optimized ("EVDO"), Code Division Multiple Access-2000 ("cdma2000 3x"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), WiFi, WiMAX, or the like.

Client 114 may be in communication with a service provider 222 via the network 106. A service provider 222 may be any entity that provides services, usually via a subscription or web service, to business or individuals. For example, the service provider 222 may be a network or internet service provider, a cellular telephone provider, an application service provider, a managed service provider, a cable service provider, or the like. The network 106 may be operated by the service provider 222.

According to an example implementation, a network manager of the service provider may offer bandwidth and/or network access to subscribers thereof to enable communication between the subscribers and other devices such as cellular phones, PDAs, PCs, Voice over Internet Protocol devices, analog telephone devices, or the like. In one implementation, the bandwidth and/or network access provided by the network provider may be utilized to distribute media objects to clients or subscribers.

Client 114 may operate in a cellular, SMR, PCS, cordless, unlicensed AWS, 700 MHz, or other spectrums and communicate with a service provider or carrier via satellite, radio waves, or cables. However, implementations are not limited to those with network access, and the implementations that describe network access are not limited by a network servicing the device. Accordingly, implementations may be applicable to any network type including, for example, TDMA, CDMA, WCDMA, GSM, WiFi, WiMAX, OFDM, UMTS, EV-DO, HSDPA/HSUPA and other standards now known or to be developed in the future.

Client 114 may be in communication with a live-streaming server 110 via the network 106. The live-streaming server 110, similar to clients 114-118, may be any device suitable for accomplishing the techniques disclosed herein. Similar to clients 114-118, the example content server may include an input/output component, a communications component, a processor, and software components such as an operating system that may control the hardware components.

The example live-streaming server 110 shown in FIG. 2B comprises a processor 238, a communications component 236, and access to an ads content database 240. The live-streaming server 110, similar to clients 114-118, may be any device suitable for accomplishing the techniques disclosed herein. The live-streaming server 110 is a device that can interconnect with other servers, communicate via the network 106 to subscribers, service providers 222, or the like, and store or have access to media content.

The ads content database 240 may contain an inventory of ads content information, such as a structured collection of records and/or data associated with various service providers, devices and users/entities associated with service provider or a device, such as client 114, networks that support communication with the devices on the network 106, etc. The ads content can include ads from a cable network carrier, a music site, a video rental entity, or the like. The information in the ads content database 240 may be structured to enable a person or program to extract desired information to share information to the user. For example, if the processor 238 updates the ads content database 240 with new ads content, the processor 218 of client 114 or the service provider 222 may have access to such information by searching the database.

Thus, a user, via client, may request ads content from the live-streaming server 110. For example, a user may be on a web browser and request access to ads content, such as an audio file or video file. The web browser may be that of a service provider 222. The service provider may manage the live-streaming server 110 directly or obtain access via the network 106. If the service provider manages and accesses the live-streaming server 110 directly, the content server may include ads content that is specific to that service provider. For example, if the service provider is a provider of video clips that users upload and download to the site, the ads content database 240 may store the uploaded ads videos for distribution to verified users upon request.

Disclosed herein are techniques for pre-fetching ads content from an entity that provides or manages ads content, such as the described live-streaming server 110. Prior to any requests for access to a particular ads object, a content server can provide an ads object over the network for storage on the user's local machine. The ads to be provided can be selected based on a compiled default set of ads pre-fetching criteria, as represented by pre-fetching criteria 223 in FIG. 2B. A suitable entity, such as client 114, the service provider 222, and the live-streaming server 110, may access, update, or maintain ads pre-fetching criteria and use it to determine ads content that should be distributed prior to any requests. For example, if an ads object meets the ads pre-fetching criteria, the ads object may be distributed for storage on a user's local machine. Thus, if the user attempts to access or callout that ads' content over the network, such as via a service provider's web site, the ads object is already locally stored (i.e., pre-fetched).

It is noted that the ads content is distributed and stored on a user's local machine. The ads pre-fetching content can be linked anywhere in a live stream. For example, a news report can have several background studio ads based on the camera being fixed. These backgrounds can be pre-fetched and intermixed with the live stream, reducing the bandwidth need of the live stream. The user's device may implement the locally stored ads, such as by playing, viewing, accessing, or otherwise accessing the locally stored ads, which may be, for example, at least one of text, audio, images, animation, video, or interactivity content. The local access reduces the congestion on the network (i.e., QPS) and also provides for faster start-up access to an ads object for the user, especially for first-time access.

Ads pre-fetching criteria may be compiled based on a number of factors either individually or in combination, such as, but not limited to, a pre-fetch wish list 224, a carrier request list 226, a recommended pre-fetch list 228, a popular access list 230, a client profile 232, or advertised media content 234. As mentioned above, a user or client may opt-out of having their information accessed to compile these ads pre-fetching criteria.

Ads pre-fetching criteria may use a popular ads list 230 to determine what ads content to distribute. For example, a popular access list may be a list of content that is commonly accessed by users that request ads content from the service provider or the content server. Thus, if a particular video or a particular song is commonly accessed, an ads object that is associated with that video or particular song may be distributed to a client's local machine.

A carrier list 226 may be a compilation of ads content that a particular carrier, such as a cable company, provides or wishes to distribute. For example, a cable company may spotlight particular movies that they predict will be heavily accessed online or a music production company may select a song that is being released for which they expect to cause heavy network traffic due to requests for the corresponding ads content. An advertised media content 234 compilation may be content that is heavily advertised, such as by a carrier, that may be expected to generate excessive network traffic.

A client profile 232 may be maintained by any appropriate entity, including the client, to set user preferences or monitor the user's history of access or user tendencies. For example, a user may set preferences that may be used to filter ads content, e.g., selected movie genres, favorite actress, etc. The client profile 232 may include demographic information about the user, such as age, address, interests, etc. In another example, the user may routinely search videos based on a particular keyword (e.g., doberman, skateboarding, etc.), the user may watch a particular television show online or commonly request new movie releases to download before going on travel or before the weekend. The user's device may be set up to monitor the user's usage or the user's travel plans (such as via a personal planner program) and add appropriate content to the pre-fetch wish list.

Of course, the data associated with the user will not be associated with the user's identity. The user's privacy will always be respected and access to such data highly restricted. The user will always have the ability to opt-out of any data collected on them.

A pre-fetch wish list 224 may be a compilation made by the user from the user's machine. For example, a user may utilize the disclosed techniques such that new movie releases or any audio files with a particular singer are part of the ads content that is pre-fetched and distributed to the user's local machine, assuming a user has not opted-out of such distribution. In another example, the user subscribes to a service for online rentals or downloads of particular content, and a user's queue may determine the pre-fetch wish list 224. The user may or may not access the content from the pre-fetch wish list, but if they do, access to at least the locally stored ads content provides the user with faster and more efficient access.

A recommended pre-fetch list 228 may be compiled on behalf of a user, such as by a carrier or a service provider 222. The recommended pre-fetch list 228 may utilize a combination of the compilations. For example, the selection of ads content based on ads pre-fetching criteria can be filtered on behalf of a specific user, such as using information from the pre-fetch wish list 224 or the client profile 232 along with other ads pre-fetching criteria, such as the popular ads list 230. In this example, the popular ads list 230 can be filtered by features in the client profile 232, selecting ads in the popular access list that has been accessed by clients with the same or similar features as those in the client profile 232. Thus, the recommended pre-fetch list 228 may use the client profile 232 or pre-fetch wish list 224 to filter ads content for distribution. Alternately, the client profile 232 and/or pre-fetch wish list 224 may be used alone to filter the ads content.

Again as mentioned above, a user or client may opt-out of having their information accessed to compile these ads pre-fetching criteria.

Using the ads pre-fetching criteria to select ads content for distribution, at least a portion of the ads object may be distributed and pre-stored, prior to any requests for access, on the client's local device, such as client 114. When a user attempts to access a particular media stream from the network, if the client's device already has the desired ads object stored, the stored ad access can be directly from the client's device. In many circumstances, direct access is more desirable than relying on caching methods, particularly for the first-time access of an ads object.

Distribution of the ads may be in the form of streaming, downloading, broadcasting, multicasting, or any other suitable method of providing the ad for storage on the user's client 114. Multicasting may be employed to target a specific group of subscribers with pre-fetched ads content. Employing a multimedia broadcast multicast service (MBMS) enables a service for broadcasting for cellular networks, such as GSM and UMTS cellular networks. The MBMS is structured to enable use of an uplink channel for interaction between the service and the user, using multicast distribution in a core network instead of point-to-point links for each device.

To further efficiently use bandwidth, the distribution of the ads object to be stored on a user's local machine, the distribution may be done out of band or based on a balance of network resources. The distribution may occur out of band on a stream that is separate from the main data stream. Furthermore, the distributor of the ad may distribute based on a balance of network resources. The network balance may be both network-aware and stream-aware, taking into account bit rate requirements required to distribute the media object, the available bandwidth between clients and servers, and the like. The network balance may account for a particular user or geographic region, such that the distribution occurs when particular users are less likely to be accessing the network (e.g., distribute when the client is sleeping or idle for a particular amount of time). Network idle time and network type may also be evaluated to determine which type and at what times a distribution of media content most efficiently utilizes available bandwidth.

Example Implementation Timelines

Figure 3:
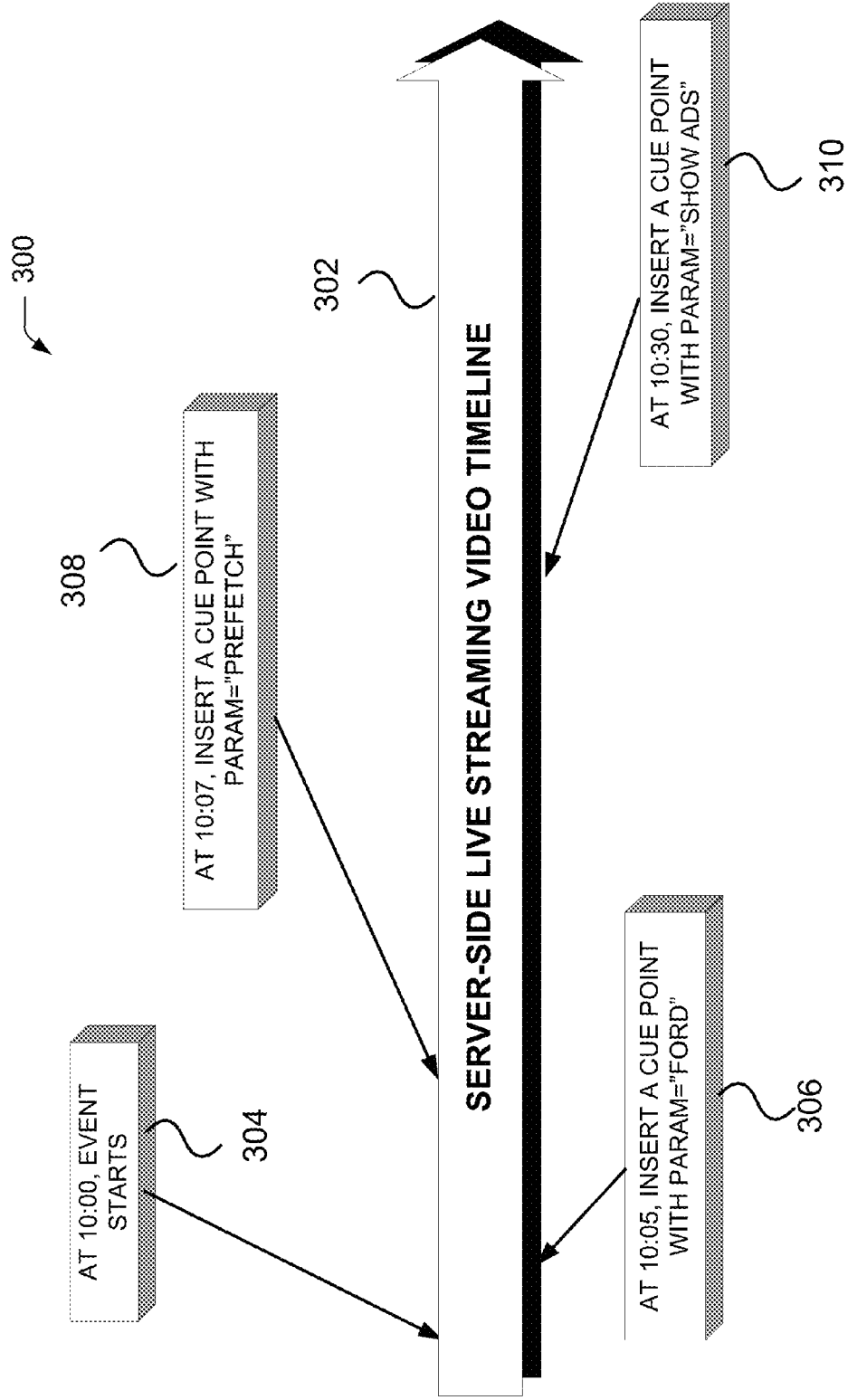
FIG. 3 is a diagrammatic representation of a server-side timeline according to an implementation of the technology.

FIG. 3 depicts an example of a server-side live stream timeline implementation 300 of the present technology, indicating a server-side live stream timeline 302, an event start time 304, an insertion cue point 306 with a criteria/parameter set as PARAM="FORD", an insertion cue point 308 with a criteria/parameter set as PARAM="PREFETCH", and an insertion cue point 310 with a criteria/parameter set as PARAM="SHOW ADS" placed in the live streaming video.

It should be noted that a cue point is a point at which the video player or live-streaming server dispatches a cuePoint™ event while a video file plays or is streaming. Cue points can be added to a FLASH® video (FLV) file at times that an action is wanted or desired to occur for another element on a web page. Text or a graphic may be displayed, for example, or synchronized with a FLASH® animation, or affect the playing of the FLV file by pausing it, seeking a different point in the video, or switching to a different FLV file.

Cue points allow one to receive control in ActionScript® code to synchronize points in a FLV file with other actions on the web page. ActionScript® is an object-oriented programming language that is designed specifically for web site animation. There are a number of ways to insert cue points into a live stream. For example, a FLASH® media encoder may be used.

Additional options of implementing cue points may include: a) instead of using FLASH® cue points, one can use the APPLE® HTTP Live Streaming (HLS) standard by adding ads-prefetching relevant information into an HLS stream M3U file and/or b) have a separate data path between the live-streaming server and client to sync ads-prefetching relevant data. HLS is an HTTP-based media streaming communications protocol. An M3U file is a plain text file that specifies the locations of one or more media files.

Figure 4:
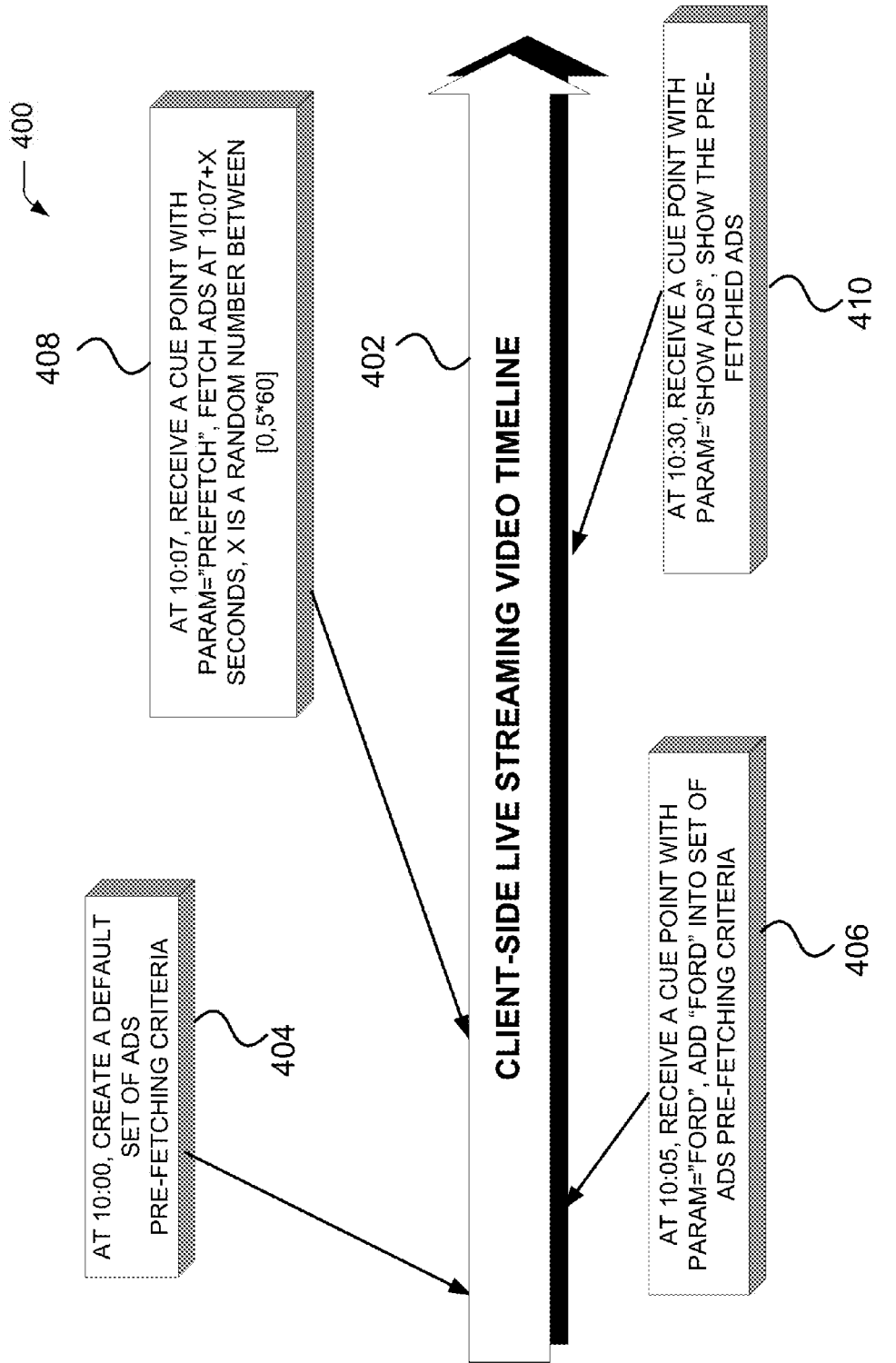
FIG. 4 is a diagrammatic representation of a client-side timeline according to an implementation of the technology.

FIG. 4 shows an example of a client-side live stream timeline implementation 400 of the present technology, indicating a client-side live stream timeline 402, a create default set of ads pre-fetching criteria 404, a receive cue point 406 with a criteria/parameter set as PARAM="FORD" into default set of ads pre-fetching criteria, a receive cue point 408 with a criteria/parameter set as PARAM="PREFETCH", thus clients 114-118 will fetch ads at a given time plus "X" seconds, where "X" is a random number calculation (e.g., between [0.5*60 seconds]) and a receive cue point 410 with a criteria/parameter set as PARAM="SHOW ADS", thus clients 114-118 will show/display the pre-fetched ads. It should be noted that timeline 402 is not a technical implementation. In this instance, timeline 402 is shown to demonstrate the correct event sequence on the client side.

Example Method Implementations

Figure 5:
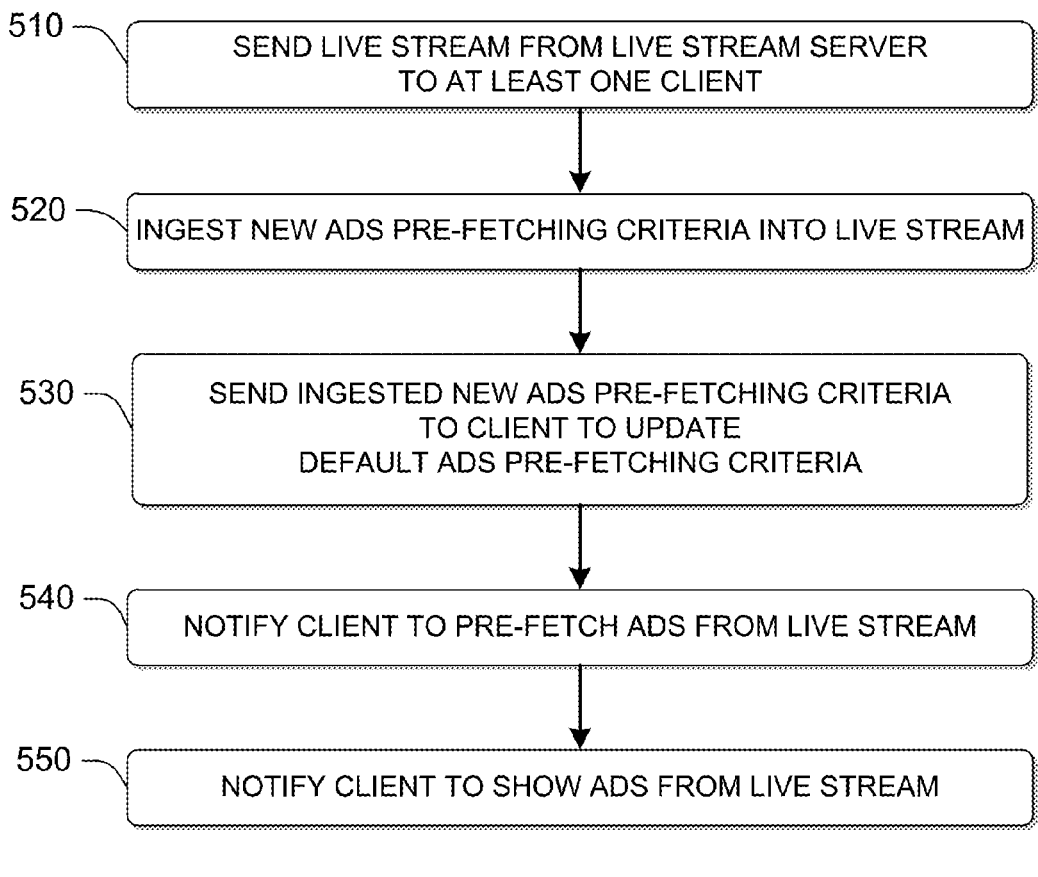
FIG. 5 is a flowchart illustrating steps that may be followed by a server in accordance with one implementation of the method or process.

FIG. 5 depicts a flowchart 500 illustrating actions, not necessarily in any particular sequence, that may be performed by a server-side implementation of the present technology. The actions include, at 510, a live-streaming server sending a live stream fro to at least one client.

At 520, the live-streaming server ingests new/extra ads pre-fetching criteria into the live stream. For example, while inserting cue points into a FLASH® stream file, a few new/extra pre-fetching criteria/parameters can be specified, such as "duration=100", "sponsor=FORD", etc.

At 530, the live-streaming server sends the ingested new/extra ads pre-fetching criteria to a client to update a default set of ads pre-fetching criteria on the client.

At 540, the live-streaming server notifies the client to pre-fetch ads based on the set of ads pre-fetching criteria.

At 550, the live-streaming server notifies the client to show ads 550.

Figure 6:
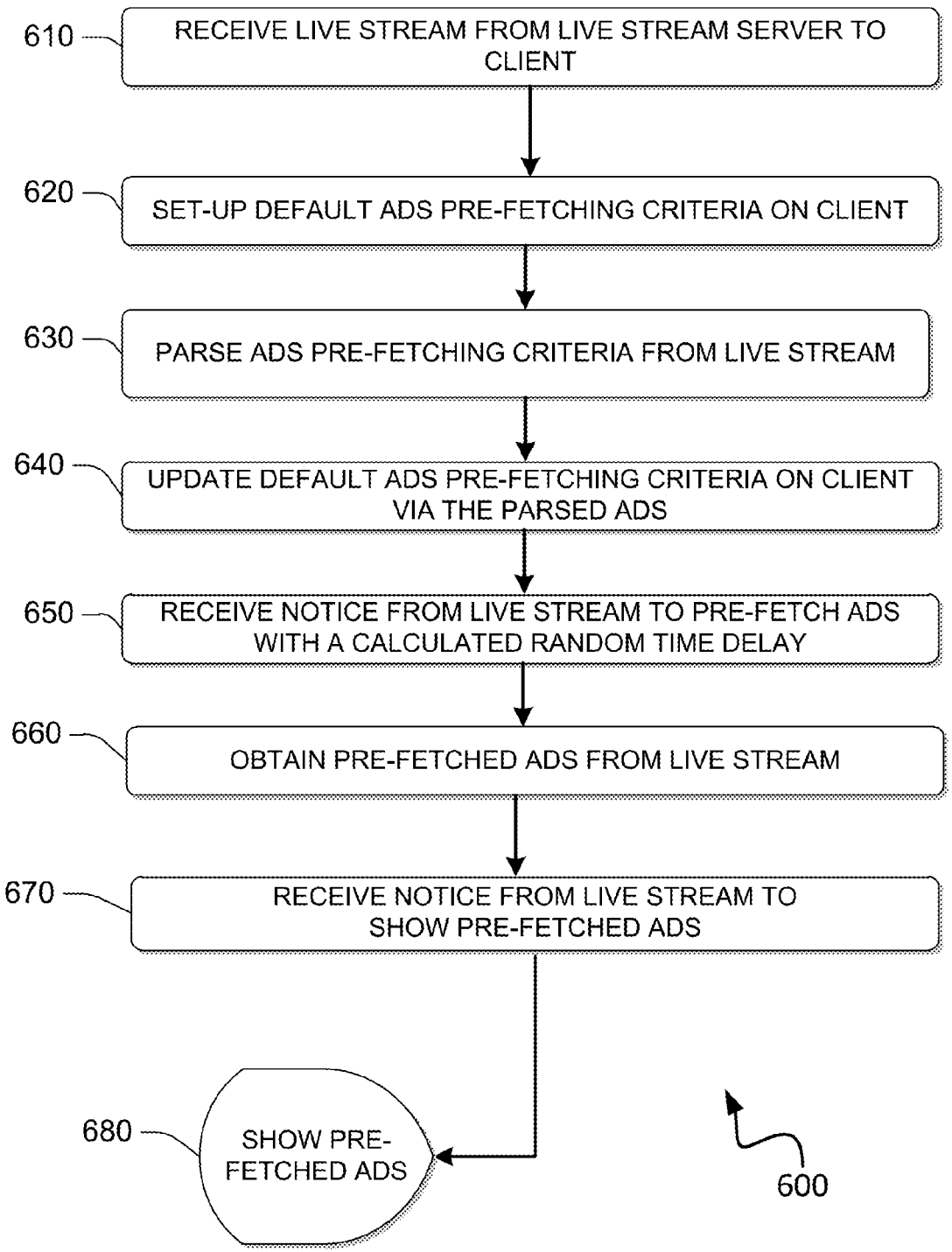
FIG. 6 is a flowchart illustrating steps that may be followed by a client in accordance with one implementation of the method or process.

FIG. 6 depicts a flowchart 600 illustrating actions, not necessarily in any particular sequence, that may be performed by a client-side implementation of the present technology. The actions include, at 610, the client receiving a live stream from a live-streaming server.

At 620, the client sets up a default set of ads pre-fetching criteria on the client.

At 630, the client parses new/extra ads pre-fetching criteria from the live stream. For example, on the client side, ActionScript® can have a listener on the cue point event. When a cue point is received, ActionScript® can get the criteria/parameters in cue point.

At 640, the client updates the default set of ads pre-fetching criteria on the client via the parsed new/extra ads pre-fetching criteria.

At 650, the client receives a notification from the live stream to pre-fetch ads.

At 660, the client obtains ads from the live stream.

At 670, the client receives a notification from the live stream to show pre-fetched ads.

At 680, the client shows the pre-fetched ads.

Through the use of the techniques of pre-fetching ads in a live stream, one implementation of the method will set-up a default set of ads pre-fetching criteria (e.g., age=user age, gender=user gender, platform=android, etc.) on a client and insert ads via a live-streaming server based on the set of ads pre-fetching criteria to the client. Next, by parsing the set of ads pre-fetching criteria from the live streaming via the client and updating a local ads targeting set of criteria/parameters in the client-side device, the method will via the live-streaming server notify the client-side device to pre-fetch ads.

When the live-streaming server notifies the client to pre-fetch ads, the client-side will be configured to fetch ads with a random delay. Next the live-streaming server notifies the client to show ads, the client is configured to either: 1) shows ads if there are pre-fetched ads, then show the pre-fetched ads or 2) fetch ads from the ads server and show the ads.

Referring to FIGS. 3 and 4 as a real example of implementing the ads pre-fetching mechanism by using, for example, Adobe Flash™ cue points. When users watch a server-side live stream on a client-side device/tool, the set of ads pre-fetching criteria will include (e.g., age=user age, gender=user gender, platform=android, etc.). Next, the server-side can insert "show FORD ads" into an event in live stream to indicate that the next ads should be from FORD. Now, when users watch the server-side live stream on a client device and client receives "show FORD ads" from the live stream, the client will add a new/extra item "show FORD ads" into ads pre-fetching criteria. Next, when the server-side notifies 1,000,000 mobile devices to pre-fetch ads at 10:00 am Jan. 20, 2012; those 1 million devices can fetch ads randomly within [10:00 am, 10:05 am], i.e., 1,000,000 queries are randomly distributed 650 over 5 minutes, thus QPS is reduced from 1,000,000 QPS to 1,000,000/(5*60 s)=3,333 QPS, thereby significantly reducing the load on the ads server. Later on, say at 10:30, a cue point is received with a criteria/parameter of "show ads" and the ads are shown via the ads server.

The technology described herein may be utilized by all online live stream providers to reduce their overall ads server QPS. The many features and advantages of the technology are apparent and since numerous modifications and variations will readily occur to those skilled in the art, it is not desired to limit the technology described herein to the exact construction and operation illustrated and described, and accordingly, all suitable modifications and equivalents may be resorted to, falling within the scope of the technology.

Example System Architecture

Figure 7:
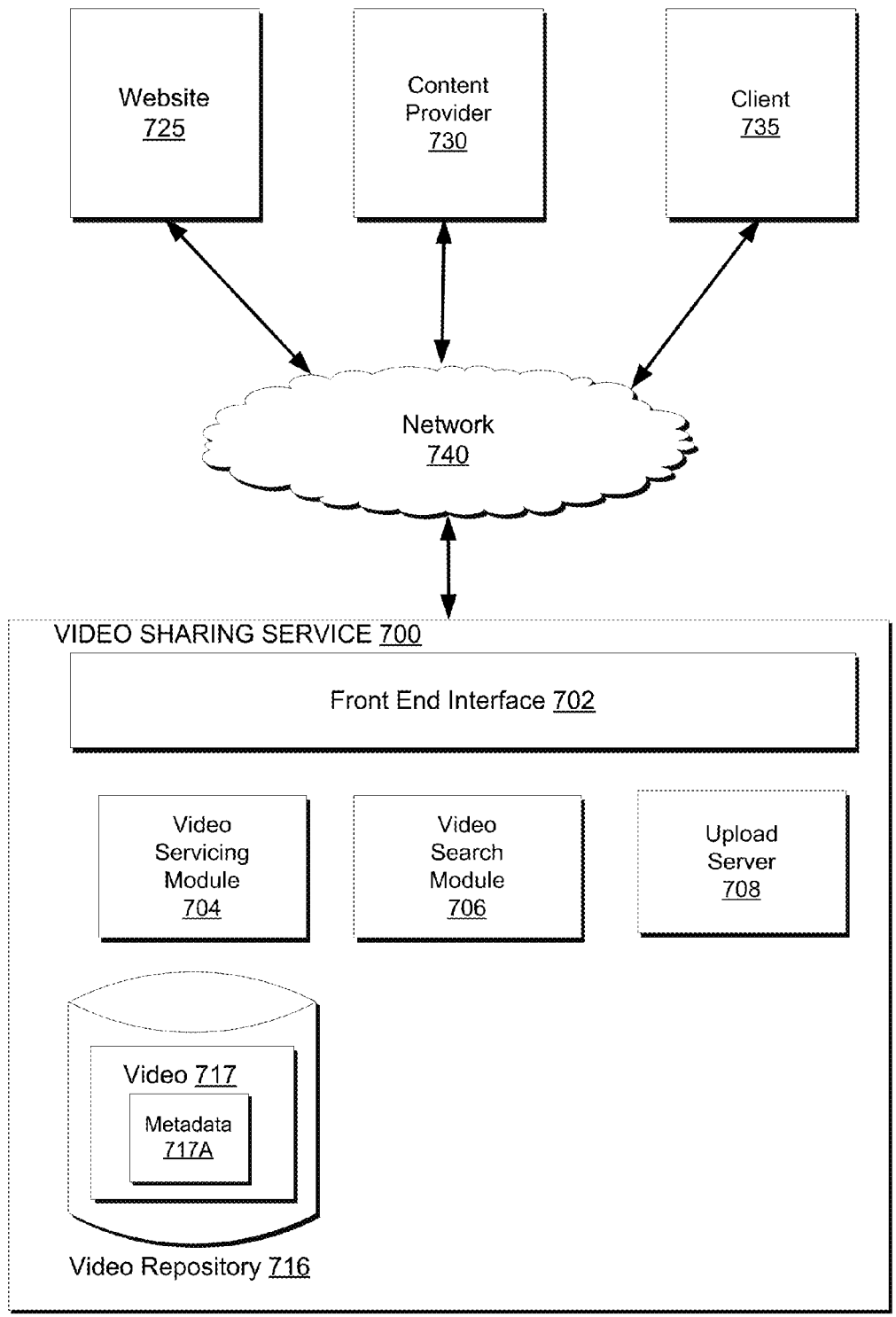
FIG. 7 an example block diagram of a system type suitable for carrying out the functions of an implementation of the technology.

FIG. 7 is a block diagram of a video hosting service 700 in which pre-fetching ads technology can be employed, according to one implementation. The video hosting service 700 represents a system such as that of a video hosting service that stores and provides videos to users via client devices 735. The video hosting service 700 communicates with a plurality of content providers 730 and client devices 735 via a network 740 to facilitate sharing of video content between users. The video hosting service 700 can additionally obtain data from various external websites 725. The video data from the content providers 130, and (optionally) the web page or other data from the websites 725, serves as input data for classifier training performed by the video hosting service 700. Note that for the sake of clarity FIG. 7 depicts only one instance of website 725, content provider 730 and client device 735, though there could be any number of each.

Generally, a user of the content provider device 730 provides video content to the video hosting service 700 and a (usually different) user uses a client device 735 (also referred to simply as "client") to view that content. In practice, content provider devices 730 may also be used to view content. Additionally, a particular content provider device 730 may be operated by the same entity that operates the video hosting service 700.

The user of the content provider device 730 performs various content provider functions. Content provider functions may include, for example, uploading a video to the video hosting service 700, editing a video stored by the video hosting service 700, editing metadata information about a video, or editing content provider preferences associated with a video.

A client device 735 is a computing device that executes client software, e.g., a web browser or built-in client application, to connect to the video hosting service 700 via a network 740 and to display videos. The client device 735 might be, for example, a personal computer, a personal digital assistant, a cellular, mobile, or smart phone, a television "set-top box," or a laptop computer. In some implementations, the client 735 includes an embedded video player such as, for example, the FLASH player from Adobe Systems, Inc. or any other player adapted for the video file formats used in the video hosting service 700.

Note that the terms "client" and "content provider" as used herein may refer to software providing client and content providing functionality, to hardware devices on which the software executes, or to the entities operating the software and/or hardware, as is apparent from the context in which the terms are used.

The website 725 comprises one or more web pages accessible to the video hosting service 700 via the network 740. The web pages comprise, for example, textual content such as HTML. The website may make available additional types of media content, such as general textual documents, presentations, audio files, image files, and the like.

The network 740 is typically the Internet, but may be any network, including but not limited to a LAN, a MAN, a WAN, a mobile wired or wireless network, a private network, or a virtual private network.

The video hosting service 700 operates on the video data from the content providers 730 (and, optionally, from the website 725) when training video classifiers. The video hosting service includes a front end interface 702, a video serving module 704, a video search module 706, an upload server 708, and a video repository 716. Other conventional features, such as firewalls, load balancers, authentication servers, application servers, failover servers, site management tools, and so forth are not shown so as to more clearly illustrate the features of the video hosting service 700.

In this description, the term "module" refers to computational logic for providing the specified functionality. A module can be implemented in hardware, firmware, and/or software. It will be understood that the named modules described herein represent one implementation of the present disclosure, and other implementations may include other modules. In addition, other implementations may lack modules described herein and/or distribute the described functionality among the modules in a different manner. Additionally, the functionalities attributed to more than one module can be incorporated into a single module. Where the modules described herein are implemented as software, the module can be implemented as a standalone program, but can also be implemented through other means, for example as part of a larger program, as a plurality of separate programs, or as one or more statically or dynamically linked libraries. In any of these software implementations, the modules are stored on the computer readable persistent storage devices of the service 700, loaded into memory, and executed by the one or more processors of the service's computers. The foregoing further applies to components described herein as "servers." As will become apparent, the various data processing operations described herein are sufficiently complex and time consuming as to require the operation of a computer system such as the system 700 in order to practice implementations of the disclosure.

The upload server 708 of the video hosting service 700 receives video content from a content provider 730. Received content is stored in the video repository 716. In response to requests from clients 735, a video serving module 704 provides video data from the video repository 716 to the clients. Clients 735 may also search for videos of interest stored in the video repository 716 using a video search module 706, such as by entering textual queries containing keywords of interest. The front end interface 702 provides the interface between client 735 and the various components of the video hosting service 700.

The video repository 716 contains a set of videos 717 submitted by content providers 730. The video repository 716 can contain any number of videos 717, such as tens of thousands or hundreds of millions. The video repository 716 is implemented using a database or file system, and indexing system for indexing and retrieving videos. Each of the videos 717 has a unique video identifier that distinguishes it from each of the other videos, such as a textual name (e.g., the string "a91qrx8"), an integer, or any other way of uniquely naming a video. The videos 717 can be packaged in various containers such as AVI, MP4, or MOV, and can be encoded using video codecs such as MPEG-2, MPEG-4, H.264, and the like. In addition to their audiovisual content, the videos 717 further have associated metadata 717A, e.g., textual metadata such as a title, description, and/or tags provided by a content provider 730 who uploaded the video, or obtained by an analysis of a video done by a component video hosting service 700.

The service 700 may be implemented using a single computer, or a network of computers, including cloud-based computer implementations. The computers are preferably server class computers including one or more high-performance CPUs and 1 G or more of main memory, as well as 500 Gb to 2 Tb of computer readable, persistent storage, and running an operating system such as LINUX or variants thereof. The operations of the service 700 as described herein can be controlled through either hardware or through computer programs installed in computer storage and executed by the processors of such servers to perform the functions described herein. The service 700 includes other hardware elements necessary for the operations described here, including network interfaces and protocols, input devices for data entry, and output devices for display, printing, or other presentations of data.

This disclosure has described in particular detail one possible implementation. Those of skill in the art will appreciate that the disclosure may be practiced in other implementations. First, the particular naming of the components and variables, capitalization of terms, the attributes, data structures, or any other programming or structural aspect is not mandatory or significant, and the mechanisms or features may have different names, formats, or protocols. Also, the particular division of functionality between the various system components described herein is merely exemplary, and not mandatory; functions performed by a single system component may instead be performed by multiple components, and functions performed by multiple components may instead performed by a single component.

Some portions of above description present the features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present disclosure include process steps and instructions described herein in the form of an algorithm. It should be noted that the process steps and instructions of the present disclosure could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present invention as described herein, and any references to specific languages are provided for invention of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

It should be noted that the language used in the specification has been principally selected for readability and instructional purposes, and may not have been selected to delineate or circumscribe the inventive subject matter. Accordingly, the disclosure is intended to be illustrative, but not limiting, of the scope of the apparatuses, methods, and computer-readable storage media, which are set forth in the following claims.

Finally, the many features and advantages of the technology are apparent from the detailed specification, and thus, it is intended by the appended claims to cover all such features and advantages of the technology which fall within the true spirit and scope of the technology. Further, since numerous modifications and variations will readily occur to those skilled in the art, it is not desired to limit the technology to the exact construction and operation illustrated and described, and accordingly, all suitable modifications and equivalents may be resorted to, falling within the scope of the technology.

In the claims appended herein, the inventor invokes 35 U.S.C. §112, paragraph 6 only when the words "means for" or "steps for" are used in the claim. If such words are not used in a claim, then the inventor does not intend for the claim to be construed to cover the corresponding structure, material, or acts described herein (and equivalents thereof) in accordance with 35 U.S.C. §112, paragraph 6.

What is claimed is:

1. A method facilitating pre-fetching ads of a live stream, the method comprising:
   sending a live stream from a live-streaming server to at least one client wherein the client is configured to pre-fetch ads with a random time delay, and wherein the random time delay is a calculated time frame measured in seconds, the calculated time frame is divided into the total number of notifications to show ads resulting in a reduced total number of query per second call outs to the live-streaming server within the calculated time frame;
   ingesting new ads pre-fetching criteria into the live stream;
   sending the ingested new ads pre-fetching criteria to a client to update a default set of ads pre-fetching criteria on the client;
   notifying via the live-streaming server for the client to pre-fetch ads based on the set of ads pre-fetching criteria; and
   notifying via the live-streaming server for the client to show ads.

2. A method of claim 1, wherein the default set of ads pre-fetching criteria is selected from a group consisting of at least one or more of a popular access list, a client profile, a recommended pre-fetch list, a carrier request list, a pre-fetch request list or advertised media content.

3. A method of pre-fetching ads while serving ads in a live stream, the method comprising:
   receiving a live stream from a live-streaming server to a client;
   setting up a default set of ads pre-fetching criteria on the client;
   parsing new ads pre-fetching criteria from the live stream;
   updating the default set of ads pre-fetching criteria on the client via the parsed new ads pre-fetching criteria;
   receiving a notification from the live stream to pre-fetch ads;
   obtaining the pre-fetched ads from the live stream;
   receiving a notification from the live stream to show ads on the client; and
   showing the pre-fetched ads on the client wherein the pre-fetching action is performed with a random time delay after the receiving a notification from the live stream to pre-fetch ads, and wherein the random time delay is a calculated time frame measured in seconds, the calculated time frame is divided into the total number of notifications to show ads resulting in a reduced total number of query per second call outs to the live-streaming server within the calculated time frame.

4. A method of claim 3, wherein the pre-fetched ads are based on the updated set of ads pre-fetching criteria on the client.

5. A method of claim 3, wherein the default set of ads pre-fetching criteria is selected from a group consisting of at least one or more of a popular access list, a client profile, a recommended pre-fetch list, a carrier request list, a pre-fetch request list or advertised media content.

6. A method of claim 3, wherein, in response to a notification to show ads from the live-streaming server, the client shows the pre-fetched ads.

7. A method of claim 3, wherein pre-fetched ads are based on the updated set of ads pre-fetching criteria.

8. One or more non-transitory computer-readable media having stored thereon instructions that, when executed on one or more processors, direct the one or more processors to perform operations for pre-fetching ads while serving ads in a live stream, the operations comprising:
- sending a live stream from a live-streaming server to at least one client wherein the client is configured to pre-fetch ads with a random time delay, and wherein the random time delay is a calculated time frame measured in seconds, the calculated time frame is divided into the total number of notifications to show ads resulting in a reduced total number of query per second call outs to the live-streaming server within the calculated time frame;
- ingesting new ads pre-fetching criteria into the live stream;
- sending the ingested new ads pre-fetching criteria to a client to update a default set of ads pre-fetching criteria on the client;
- notifying via the live-streaming server the client to pre-fetch ads based on the set of ads pre-fetching criteria; and
- notifying via the live-streaming server the client to show ads.

9. One or more non-transitory computer-readable media as recited in claim 8 wherein the default set of ads pre-fetching criteria is selected from a group consisting of at least one or more of a popular access list, a client profile, a recommended pre-fetch list, a carrier request list, a pre-fetch request list or advertised media content.

10. One or more non-transitory computer-readable media having stored thereon instructions that, when executed on one or more processors, direct the one or more processors to perform operations for pre-fetching ads while serving ads in a live stream, the operations comprising:
- receiving a live stream from a live-streaming server to a client wherein the client is configured to pre-fetch ads with a random time delay, and wherein the random time delay is a calculated time frame measured in seconds, the calculated time frame is divided into the total number of notifications to show ads resulting in a reduced total number of query per second call outs to the live-streaming server within the calculated time frame;
- setting up a default set of ads pre-fetching criteria on the client;
- parsing new ads pre-fetching criteria from the live stream;
- updating the default set of ads pre-fetching criteria on the client via the parsed new ads pre-fetching criteria;
- receiving a notification from the live stream to pre-fetch ads;
- obtaining the pre-fetched ads from the live stream;
- receiving a notification from the live stream to show ads on the client; and
- showing the pre-fetched ads on the client.

11. One or more non-transitory computer-readable media as recited in claim 10 wherein the pre-fetched ads being based on the updated set of ads pre-fetching criteria on the client.

12. One or more non-transitory computer-readable media as recited in claim 10 wherein the default set of ads pre-fetching criteria is selected from a group consisting of at least one or more of a popular access list, a client profile, a recommended pre-fetch list, a carrier request list, a pre-fetch request list or advertised media content.

13. One or more non-transitory computer-readable media as recited in claim 10 wherein upon notifying the client to show ads via the live-streaming server, the client, will: 1) if there are pre-fetched ads, then show the pre-fetched ads or 2) fetch ads from an ads server and show the ads.

14. One of more non-transitory computer-readable media as recited in claim 10 wherein the pre-fetched ads are based on the updated set of ads pre-fetching criteria.

\* \* \* \* \*